(12) United States Patent
Fan et al.

(10) Patent No.: US 11,697,741 B2
(45) Date of Patent: Jul. 11, 2023

(54) ANTI-GLARE FILM AND POLARIZER WITH THE SAME

(71) Applicant: BenQ Materials Corporation, Taoyuan (TW)

(72) Inventors: Gang-Lun Fan, Taoyuan (TW); Wei-Hsien Chen, Taoyuan (TW); Kuo-Hsuan Yu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 463 days.

(21) Appl. No.: 17/076,857

(22) Filed: Oct. 22, 2020

(65) Prior Publication Data

US 2021/0388210 A1 Dec. 16, 2021

(30) Foreign Application Priority Data

Jun. 15, 2020 (TW) ................. 109120100

(51) Int. Cl.
| | | |
|---|---|---|
| *G02B 1/111* | (2015.01) |
| *C09D 7/61* | (2018.01) |
| *C09D 4/06* | (2006.01) |
| *C09D 133/08* | (2006.01) |
| *C09D 133/10* | (2006.01) |
| *C09D 133/14* | (2006.01) |
| *C08K 3/36* | (2006.01) |
| *C09D 5/00* | (2006.01) |
| *G02B 5/30* | (2006.01) |
| *C09D 7/40* | (2018.01) |
| *C09D 175/16* | (2006.01) |
| *C09D 135/02* | (2006.01) |
| *C08J 7/04* | (2020.01) |
| *C09D 183/12* | (2006.01) |

(52) U.S. Cl.
CPC ............ *C09D 5/006* (2013.01); *C08J 7/0427* (2020.01); *C09D 7/61* (2018.01); *C09D 7/69* (2018.01); *C09D 7/70* (2018.01); *C09D 133/08* (2013.01); *C09D 135/02* (2013.01); *C09D 175/16* (2013.01); *G02B 1/111* (2013.01); *G02B 5/3025* (2013.01); *C08K 3/36* (2013.01); *C08K 2201/006* (2013.01); *C08K 2201/011* (2013.01); *C09D 183/12* (2013.01)

(58) Field of Classification Search
None
See application file for complete search history.

(56) References Cited

U.S. PATENT DOCUMENTS

| | | | | |
|---|---|---|---|---|
| 2010/0238384 A1* | 9/2010 | Tochigi | ............ | G02F 1/133502 |
| | | | | 359/488.01 |
| 2018/0252848 A1* | 9/2018 | Ludemann | ........... | G02B 5/0242 |

FOREIGN PATENT DOCUMENTS

| | | |
|---|---|---|
| TW | 201946986 A | 12/2019 |
| TW | I693734 B | 5/2020 |

* cited by examiner

*Primary Examiner* — Sheeba Ahmed

(57) ABSTRACT

An anti-glare film is disclosed. The anti-glare film comprises a transparent substrate and an anti-glare layer comprising an acrylic binder resin, a polyether-modified siloxane and a plurality of silica nanoparticles, wherein the silica nanoparticles are flocculated into a micro-floccule with an average secondary particle diameter of 1,500 nm to 3,100 nm. The present anti-glare film can provide a reliable anti-glare property with low haze and fine surface.

20 Claims, 6 Drawing Sheets

ANTI-GLARE FILM AND POLARIZER WITH THE SAME

CROSS-REFERENCE TO RELATED APPLICATION

This application claims the priority benefit of Taiwanese Application Serial Number 109120100, filed on Jun. 15, 2020, which is incorporated herein by reference.

TECHNICAL FILED

The present invention relates to an anti-glare film for display, and more particularly to an anti-glare film that can provide a reliable anti-glare property with low haze.

BACKGROUND OF THE INVENTION

As the developing of the display technology, such as liquid crystal display (LCD) or organic light emitting diode display (OLED), the demands for the performance of displays such as high contrast, wide viewing angle, high brightness, thinness, large screen dimension, high fine resolution and diversified functions have been widely required.

Displays are often used in environment having ambient lighting, and glare will occur on the display surface caused by reflection. The glare originated from the light external to the display will deteriorate the image quality and visibility. Thus, an optical film, such as an anti-glare film or an anti-reflection film, is adhered on the display surface for modulating the environmental light and reducing the light reflected thereon for preventing the image quality deterioration.

For exhibiting a good anti-glare property in bright environment but maintaining a high contrast of the display image in dark environment, a low haze anti-glare film containing small-size organic microparticles is proposed. In the related state of the art, it is proposed that the anti-glare film can be obtained from coating an anti-glare layer containing organic microparticles on a transparent substrate to achieve an anti-glare effect by forming an uneven surface from the agglomeration of the microparticles and nanoparticles. However, the agglomeration of the organic microparticles and nanoparticles in the coating is hard to be controlled and thus, the anti-glare property of the coating may be insufficient or the glare property thereof may be increased. Moreover, when the anti-glare film is obtained from coating an anti-glare layer containing organic microparticles of a large size or/and silica particles of a micron size on a transparent substrate, the light diffusion of the particles may cause the increased haze of the anti-glare film, thereby an anti-glare film with low haze but having good anti-glare properties cannot be provided.

Accordingly, there is a need for an anti-glare film with low haze but having satisfactory anti-glare properties.

SUMMARY OF THE INVENTION

An aspect of the present invention is to provide an anti-glare film comprising a transparent substrate and an anti-glare layer formed on the transparent substrate, wherein the anti-glare layer comprises micro-floccules formed by flocculation of silica nanoparticles and therefore, the anti-glare film can provide a fine surface with low haze but reliable anti-glare property. The present anti-glare film comprises a transparent substrate and an anti-glare layer formed on the transparent substrate, and the anti-glare layer comprises an acrylic binder resin, a polyether-modified siloxane and a plurality of silica nanoparticles, wherein the average secondary particle size of each micro-floccule formed by flocculation of the silica nanoparticles is ranging between 1,500 nm and 3,100 nm.

The present anti-glare film provides a fine surface with low haze and excellent anti-glare property. The haze of the present anti-glare film is not more than 5% and preferably not more than 3% via the flocculation of silica nanoparticles, the arithmetic mean height of surface roughness (Sa) thereof is ranging between 0.03 μm and 0.18 μm, the maximum height of surface roughness (Sz) thereof is ranging between 0.30 μm and 1.80 μm, the average roughness of centerline (Ra) thereof is ranging between 0.01 μm and 0.16 μm, the height of total roughness (Ry) is ranging between 0.10 μm and 0.90 μm, the average peak spacing of total roughness (RSm) thereof is ranging between 20 μm and 200 μm, and the slope of root mean square of total roughness (Rdq) thereof is ranging between 0.36° and 4.60°.

In the anti-glare layer of the present anti-glare film, the average primary particle diameter of silica nanoparticles of specific surface area method (BET) is ranging between 10 nm and 160 nm and preferably ranging between 20 nm and 100 nm.

In preferred embodiments of the present anti-glare film, in the anti-glare layer, the amount of the silica nanoparticles is ranging between 0.1 parts and 15 parts by weight, preferably ranging between 0.5 parts and 12 parts by weight and more preferably ranging between 0.8 parts and 10 parts by weight per hundred parts by weight of the acrylic binder resin.

In preferred embodiments of the present anti-glare film, in the anti-glare layer, the amount of the polyether-modified siloxane is ranging between 0.01 parts and 8 parts by weight and preferably 0.05 parts and 5 parts per hundred parts by weight of the acrylic binder resin. Further, the weight ratio of the silica nanoparticles to the polyether-modified siloxane is ranging between 0.5 and 100 and preferably ranging between 0.5 and 80.

In the anti-glare layer of the present anti-glare film, the polyether-modified siloxane is represented by the following formula (I):

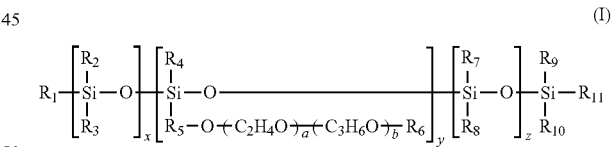

wherein, each of $R_1$ to $R_4$ and $R_6$ to $R_u$ is an hydrogen or a $C_1$ to $C_8$ hydrocarbyl-group, $R_5$ is a $C_1$ to $C_{10}$ hydrocarbyl-group, x, y and a is 1 or an integer greater than 1, z and b is 0 or an integer greater than 0, and the average molecular weight of the polyether-modified siloxane measured by matrix-assisted laser desorption ionization-time of flight mass spectrometry (MALDI-TOF MS) is ranging between 200 and 6,000 and the average ethylene oxide (EO) unit thereof is ranging between 1 and 40.

In the present anti-glare film, the thickness of the anti-glare layer can be ranging between 2 μm and 10 μm and preferably ranging between 2 μm and 8 μm.

Another aspect of the present invention is to provide an anti-glare film, the anti-glare layer of the anti-glare film can further comprise organic particles to adjust the haze thereof. The anti-glare film comprises a transparent substrate and an anti-glare layer, and the anti-glare layer comprises an acrylic binder resin, a polyether-modified siloxane, a plurality of silica nanoparticles and a plurality of organic particles, wherein the average secondary particle size of each micro-floccule formed by flocculation of the silica nanoparticles is ranging between 1,500 nm and 3,100 nm.

In the anti-glare layer containing organic particles of the present anti-glare film, the refractivity of the organic particles can be ranging between 1.4 and 1.6, and the diameter thereof can be ranging between 0.5 µm and 6 µm and preferably ranging between 1 µm and 4 µm.

In the present anti-glare film, the acrylic binder resin of the anti-glare layer comprises a (meth)acrylate composition and a initiator, wherein the (meth)acrylate composition comprises 35 to 50 parts by weight of the polyurethane (meth)acrylate oligomer with a functionality of 6 to 15, 12 to 20 parts by weight of the (meth)acrylate monomer with a functionality of 3 to 6 and 1.5 to 12 parts by weight of the (meth)acrylate monomer with a functionality of less than 3, and the number average molecular weight (Mn) of the polyurethane (meth)acrylate oligomer with a functionality of 6 to 15 is ranging between 1,000 and 4,500.

A further aspect of the present invention is to provide a method for preparing an anti-glare film. The method comprises the steps of, mixing the acrylic binder resin, the polyether-modified siloxane and the nanoparticles evenly to form an anti-glare composition; coating the anti-glare composition on the transparent substrate; drying and curing the coated substrate to form an anti-glare film.

A yet aspect of the present invention is to provide a polarizer comprising a polarizing element and an anti-glare film as above-disclosed formed thereon.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

Figure 1:
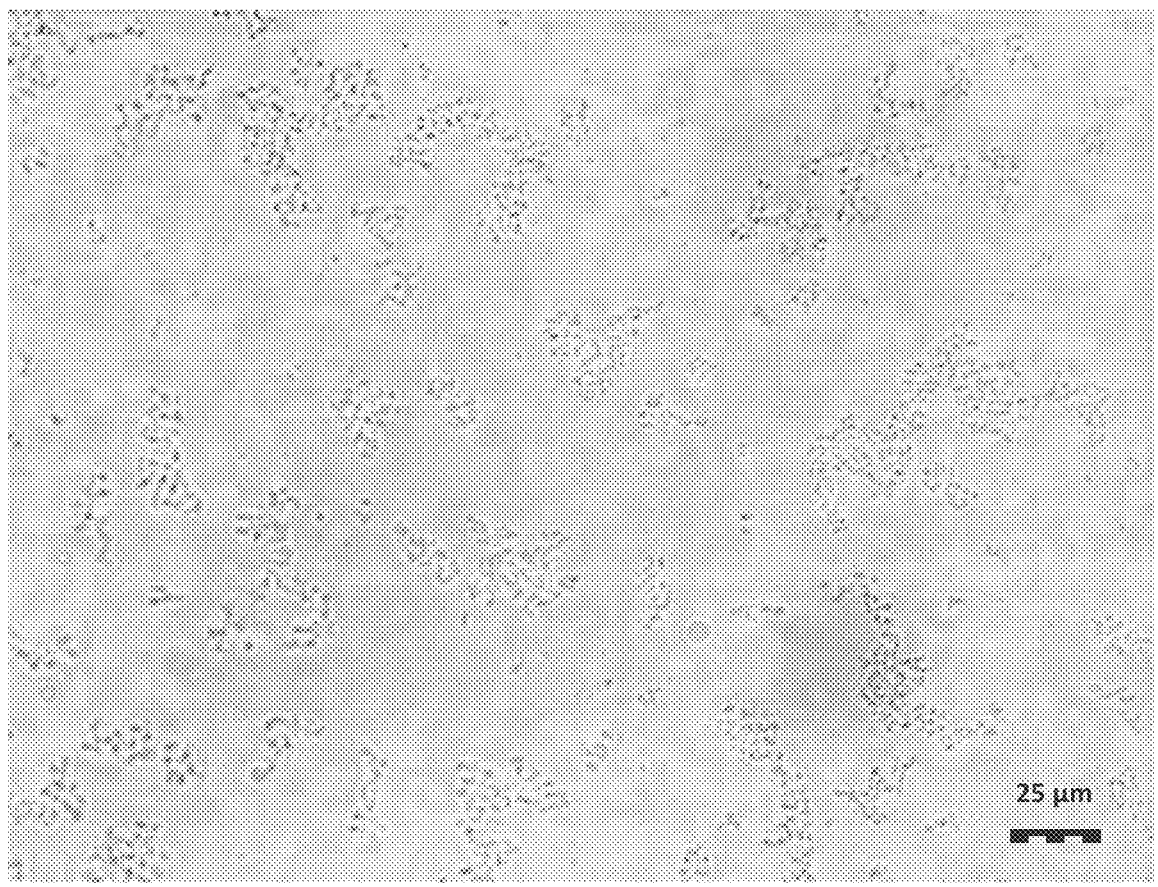
FIG. 1 is the light transmission image of the anti-glare film of Example 1 under an optical microscope at a magnification of 200.

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or methacrylate.

An aspect of the present invention is to provide an anti-glare film comprising a transparent substrate and an anti-glare layer formed on the transparent substrate, wherein part of the silica nanoparticles are flocculated into micro-floccules. The present anti-glare film comprises a transparent substrate and an anti-glare layer formed on the transparent substrate, and the anti-glare layer comprises an acrylic binder resin, a polyether-modified siloxane and a plurality of silica nanoparticles, wherein the average secondary particle size of each micro-floccule formed by flocculation of the silica nanoparticles is ranging between 1,500 nm and 3,100 nm.

The present anti-glare film provides excellent anti-glare property but low haze. In an embodiment of the present anti-glare film, the haze of the anti-glare film is not more than 5% and preferably not more than 3%. The arithmetic mean height of surface roughness (Sa) of the anti-glare film is ranging between 0.03 µm and 0.18 µm, the maximum height of surface roughness (Sz) thereof is ranging between 0.30 µm and 1.80 µm, the average roughness of centerline (Ra) thereof is ranging between 0.01 µm and 0.16 µm, the height of total roughness (Ry) is ranging between 0.10 µm and 0.90 µm, the average peak spacing of total roughness (RSm) thereof is ranging between 20 µm and 200 µm, and the slope of root mean square of total roughness (Rdq) thereof is ranging between 0.36° and 4.60°. The present anti-glare film can provides a fine surface with low haze but excellent anti-glare property by the flocculation of silica nanoparticles.

In a preferred embodiment of the present anti-glare film, the arithmetic mean height of surface roughness (Sa) of the anti-glare film is ranging between 0.04 µm and 0.13 µm, the maximum height of surface roughness (Sz) thereof is ranging between 0.40 µm and 1.50 µm, the average roughness of centerline (Ra) thereof is ranging between 0.02 µm and 0.15 µm, the height of total roughness (Ry) is ranging between 0.10 μm and 0.80 μm, the average peak spacing of total roughness (RSm) thereof is ranging between 30 μm and 180 μm, and the slope of root mean square of total roughness (Rdq) thereof is ranging between 0.50° and 3.00°.

In an embodiment of the present invention, the substrate suitable can be the film with good mechanical strength and light transmittance, such as, but not limited to polymethyl methacrylate (PMMA), polyethylene terephthalate (PET), polyethylene naphthalate (PEN), polycarbonate (PC), triacetate cellulose (TAC), polyimide (PI), polyethylene (PE), polypropylene (PP), polyvinyl alcohol (PVA), polyvinyl chloride (PVC) or cyclic olefin copolymer (COC) and the like.

In a preferred embodiment of the present invention, the light transmittance of the substrate is more than 80% and preferably is more than 90%. The thickness of the substrate used in the present anti-reflective film is ranging between 10 μm and 500 μm, and preferably ranging between 15 μm and 250 μm, and more preferably ranging between 20 μm and 100 μm.

In the present anti-glare film, the thickness of the anti-glare layer can be ranging between 2 μm and 10 μm and preferably ranging between 2 μm and 8 μm.

In the present anti-glare film, the average primary particle diameter of silica nanoparticles of specific surface area method (BET) used in the anti-glare layer is ranging between 10 nm and 160 nm and preferably ranging between 20 nm and 100 nm. In the embodiments of the present invention, the silica nanoparticles can be unmodified or surface-modified silica nanoparticles, and the surface-modified silica nanoparticles can be alkyl-containing, acrylic-containing or epoxy-containing siloxane modified silica nanoparticles, and the polarities between the silica nanoparticles and the binder resin are similar, thereby the silica nanoparticles can distribute evenly in the anti-glare layer.

In an embodiment of the present anti-glare film, in the anti-glare layer, the amount of the silica nanoparticles is ranging between 0.1 parts and 15 parts by weight, preferably ranging between 0.5 parts and 12 parts by weight and more preferably ranging between 0.8 parts and 10 parts by weight per hundred parts by weight of the acrylic binder resin.

In the anti-glare layer of the present anti-glare film, the polyether-modified siloxane is represented by the following formula (I):

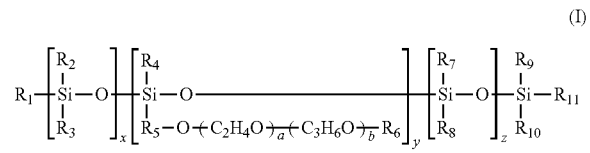

wherein, each of $R_1$ to $R_4$ and $R_6$ to $R_u$ is an hydrogen or a $C_1$ to $C_8$ hydrocarbyl-group, $R_5$ is a $C_1$ to $C_{10}$ hydrocarbyl-group, x, y and a is 1 or an integer greater than 1, z and b is 0 or an integer greater than 0, and the average molecular weight of the polyether-modified siloxane measured by matrix-assisted laser desorption ionization-time of flight mass spectrometry (MALDI-TOF MS) is ranging between 200 and 6,000 and the average ethylene oxide (EO) unit thereof is ranging between 1 and 40.

In the polyether-modified siloxane of the aforementioned formula (I), wherein the x is an integer from 1 to 500, preferably an integer from 1 to 100 and more preferably an integer from 1 to 10; the y is an integer from 1 to 100 and preferably an integer from 1 to 50; the z is an integer from 0 to 500, preferably an integer from 0 to 100 and more preferably an integer from 0 to 10; the a is an integer from 1 to 40, preferably an integer from 1 to 35 and more preferably an integer from 1 to 30; and the b is an integer from 0 to 500, preferably an integer from 0 to 100 and more preferably an integer from 0 to 40. In the polyether-modified siloxane of the aforementioned formula (I), when each of $R_1$ to $R_u$ is a $C_1$ to $C_{10}$ hydrocarbyl-group, the hydrocarbyl-group can be a substituted $C_u$ to $C_{10}$ hydrocarbyl-group, and the substituted group can be a hydrocarbyl-group, a hydroxyl group or an alkoxy group. In the polyether-modified siloxane of the aforementioned formula (I), the ethylene oxide (EO) unit and propylene oxide (PO) unit are linked by random copolymerization, alternative copolymerization or block copolymerization.

In the preferred embodiments of the present anti-glare film, the average molecular weight of polyether-modified siloxane of the aforementioned formula (I) measured by matrix-assisted laser desorption ionization-time of flight mass spectrometry (MALDI-TOF MS) is ranging between 200 and 4,500 and preferably ranging between 200 and 3,000, and the average ethylene oxide (EO) unit thereof is ranging between 1 and 35 and preferably ranging between 1 and 30.

The polyether-modified siloxane of the aforementioned formula (I) can be, but not limited to, BYK-347, BYK-348, BYK-349, BYK-331, BYK-307 or BYK-3455 (available from BYK-Chemie, Germany).

In the preferred embodiments of the present anti-glare film, the amount of the polyether-modified siloxane is ranging between 0.01 parts and 8 parts by weight and preferably 0.05 parts and 5 parts per hundred parts by weight of the acrylic binder resin.

In the present anti-glare film, the polyether-modified siloxane of the aforementioned formula (I) in the anti-glare layer can drive the silica nanoparticles to flocculate into micro-flocculate, and the average secondary particle size of each micro-floccule formed by flocculation of the silica nanoparticles is ranging between 1,500 nm and 3,100 nm. Without being bound by theory, in the anti-glare layer of the present anti-glare film, when the weight ratio of the silica nanoparticles to the polyether-modified siloxane is ranging between 0.5 and 100, the polyether-modified siloxane is beneficial to form the micro-floccules formed by flocculation of the silica nanoparticles of an aforementioned average secondary particle size, thereby the anti-glare film can be given excellent anti-glare properties without the decrease of surface fineness; when the weight ratio of the silica nanoparticles to the polyether-modified siloxane is out of the aforementioned range, the floccules of the silica nanoparticles of an aforementioned average secondary particle size cannot be formed and therefore, the anti-glare film may show poor anti-glare properties, high haze or defects in the appearance. Moreover, in a preferred embodiment of the present anti-glare film, the weight ratio of the silica nanoparticles to the polyether-modified siloxane is preferably ranging between 0.5 and 80.

Furthermore, in the present anti-glare film, the micro-floccules formed by flocculation of silica nanoparticles in the anti-glare layer can aggregate, disperse or aggregate into a co-continuous network structure. The generation of the anti-glare properties will not be affected by the dispersion of micro-floccules, and the anti-glare properties can be enhanced by the aggregation.

In another embodiment of the present anti-glare film, other silica nanoparticles with a higher hydrophobicity can be further added to the anti-glare layer without the physical properties of the anti-glare film being affected, and the huge difference of the polarities between the silica nanoparticles and the binder resin make the silica nanoparticles can distribute on the top of anti-glare layer, thereby the surface properties of the anti-glare film can be adjusted, for example, the corresponding silica nanoparticles can be added to enhance the scratch resistance of the surface.

In the present anti-glare film, the acrylic binder resin of the anti-glare layer comprises a (meth)acrylate composition and a initiator, wherein the (meth)acrylate composition comprises 35 to 50 parts by weight of the polyurethane (meth)acrylate oligomer with a functionality of 6 to 15, 12 to 20 parts by weight of the (meth)acrylate monomer with a functionality of 3 to 6 and 1.5 to 12 parts by weight of the (meth)acrylate monomer with a functionality of less than 3.

In a preferred embodiment of the present invention, the molecular weight of the polyurethane (meth)acrylate oligomer with a functionality of 6 to 15 is not less than 1,000 and preferably ranging between 1,000 and 4,500. In another preferred embodiment of the present invention, the polyurethane (meth)acrylate oligomer with a functionality of 6 to 15 is preferably an aliphatic polyurethane (meth)acrylate oligomer.

In a preferred embodiment of the present invention, the molecular weight of the (meth)acrylate monomer with a functionality of 3 to 6 is less than 1,000 and preferably less than 800. The suitable (meth)acrylate monomer with a functionality of 3 to 6 can be, but not limited to, pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A), pentaerythritol tri(meth)acrylate (PET(M)A) or combinations thereof; preferably, but not limited to, pentaerythritol triacrylate (PETA), dipentaerythritol hexaacrylate (DPHA), dipentaerythritol pentaacrylate (DPPA) or combinations thereof.

In a preferred embodiment of the present invention, the (meth)acrylate monomer with a functionality of less than 3 can be a (meth)acrylate monomer with a functionality of 1 or 2 and the molecular weight thereof is less than 500. The suitable polyurethane (meth)acrylate oligomer with a functionality of less than 3 can be, but not limited to, 2-ethylhexyl (meth)acrylate (2-EH(M)A), 2-hydroxyethyl (meth)acrylate (2-HE(M)A), 3-hydroxypropyl (meth)acrylate (3-HP(M)A), 4-hydroxybutyl (meth)acrylate (4-HB(M)A), 2-butoxyethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A), isobornyl (meth)acrylate (IBO(M)A) or combinations thereof; preferably, but not limited to, 1,6-hexanediol diacrylate (HDDA), cyclic trimethylopropane formal acrylate (CTFA), 2-phenoxyethyl acrylate (PHEA), isobornyl acrylate (IBOA) or combinations thereof.

The suitable initiator used in the acrylic binder resin of the present invention can be selected from those commonly used in the related art, such as, but not limited to, acetophenones-based initiator, diphenylketones-based initiator, propiophenones-based initiator, benzophenones-based initiator, bifunctional α-hydroxyketones-based initiator, acylphosphine oxides-based initiator and the like. The above-mentioned initiators can be used alone or in combination.

According to the usages and requirements of viewing angle, the organic particles can be added in the present anti-glare film to adjust the haze, especially used in adjusting the internal scattering effect of the anti-glare layer.

Therefore, another aspect of the present invention is to provide an anti-glare film, the anti-glare layer of the anti-glare film can further comprise organic particles to adjust the haze thereof. The anti-glare film comprises a transparent substrate and an anti-glare layer, and the anti-glare layer comprises an acrylic binder resin, a polyether-modified siloxane, a plurality of silica nanoparticles and a plurality of organic particles, wherein the average secondary particle size of each micro-floccule formed by aggregation of the silica nanoparticles is ranging between 1,500 nm and 3,100 nm.

The suitable organic particles of the present anti-glare film can be selected with appropriate refractivity and particle size, and the haze of the anti-glare film can be adjusted by controlling the usage amount of the organic particles. The refractivity of suitable the organic particles can be ranging between 1.4 and 1.6, and the diameter thereof can be ranging between 0.5 μm and 6 μm and preferably ranging between 1 μm and 4 μm. In the embodiments of the present anti-glare film with a haze that adjusted by adding organic particles, the haze can be ranging between 1% and 50%, but not limited to.

When the haze of the present anti-glare film is adjusted by adding organic particles, the usage amount of the organic particles can be controlled according to the actual haze required, and is preferably 0.5 parts and 15 parts by weight and more preferably 1 part and 12 parts by weight per hundred parts by weight of acrylic binder resin.

The suitable organic particles used in the anti-glare layer of present anti-glare film is polymethyl methacrylate resin particles, polystyrene resin particles, styrene-methyl methacrylate copolymer particles, polyethylene resin particles, epoxy resin particles, polysiloxane resin particles, polyvinylidene fluoride resin particles or polyvinyl fluoride resin particles. In a preferred embodiment of the present invention, the preferable organic particles used is polymethylmethacrylate resin particles, polystyrene resin particles or styrene/methyl methacrylate copolymer particles.

On the surface of the present anti-glare film, other optical function layers can be selectively coated, for example, a low refractive layer is coated to provide anti-reflection thereon.

A further aspect of the present invention is to provide a method for preparing an anti-glare film. Wherein, the method comprises the steps of, mixing the polyurethane (meth)acrylate oligomer with a functionality of 6 to 15, the (meth)acrylate monomer with a functionality of 3 to 6, the (meth)acrylate monomer with a functionality of less than 3, the initiator and the suitable organic solvent evenly to form an acrylic binder resin; adding the silica nanoparticles and/or organic particles, the polyether-modified siloxane and the solvent to the acrylic binder resin, and mixing evenly to form an anti-glare composition; coating the anti-glare composition on the transparent substrate, and drying to remove the solvent and then curing by radiation or electron beam to form an anti-glare layer on the substrate, obtaining an anti-glare film.

The solvents suitable for preparation of the present anti-glare film can be the organic solvents commonly used in the related art, such as ketones, aliphatic, cycloaliphatic or aromatic hydrocarbons, ethers, esters or alcohols. The acrylic binder resin and the anti-glare composition can comprise one or more organic solvents. The suitable organic solvent can be such as, but not limited to, acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, isopropanol, n-butanol, isobutanol, cyclohexanol, diacetone alcohol, propylene glycol methyl ether acetate or tetrahydrofuran and the likes.

In other embodiments of the present invention, the additives such as, antistatic agents, colorants, flame retardants, ultraviolet absorbers, antioxidants, surface modifiers, leveling agents without polyether modification or defoamers can be optionally added to the prepared anti-glare composition to provide required properties thereof.

The aforementioned anti-glare composition can be applied to the substrate by any method known in the related art, for example, bar coating, doctor blade coating, dip coating, roll coating, spinning coating, spray coating, slot-die coating and the like.

A yet aspect of the present invention is to provide a polarizer comprising a polarizing element and an anti-glare film as aforementioned formed thereon.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof.

EXAMPLE

Preparation Example 1: Preparation of Acrylic Binder Resin I 42 parts by weight of polyurethane acrylate oligomer (the functionality of 6, available from Miwon Specialty Chemical, Korea), 4.5 parts by weight of pentaerythritol triacrylate (PETA), 12 parts by weight of dipentaerythritol hexaacrylate (DPHA), 3 parts by weight of isobornyl acrylate (IBOA), 4 parts by weight of initiator (Chemcure-481, available from Chembridge International Co., Ltd., Taiwan), 24.5 parts by weight of ethyl acetate (EAC) and 10 parts by weight of n-butyl acetate (nBAC) were mixed for 1 hour to form an acrylic binder resin I.

Example 1: Preparation of Anti-Glare Film 200 parts by weight of the acrylic binder resin I, 10 parts by weight of silica nanoparticle dispersion sol with an average primary particle diameter of specific surface area method (BET) of 40 nm to 50 nm (MEK-ST-L, solid content 30%, solvent: butanone, available from Nissan Chemical, Japan), 47.5 parts by weight of polyether-modified polydimethylsiloxane (BYK-307, solid content 10%, solvent: ethyl acetate, available from BYK, Germany), 60 parts by weight of ethyl acetate (EAC) and 120 parts by weight of n-butyl acetate (nBAC) were mixed for 1 hour to form an anti-glare composition. The prepared anti-glare composition was coated on a polyethylene terephthalate (PET) substrate with a thickness of 80 μm, and then the coated substrate was dried and was cured by UV lamp with a radiation dose of 80 mJ/cm$^2$ under a nitrogen atmosphere. Thus, an anti-glare film comprising an anti-glare hard coating layer with a thickness of 3.6 μm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Figure 4:
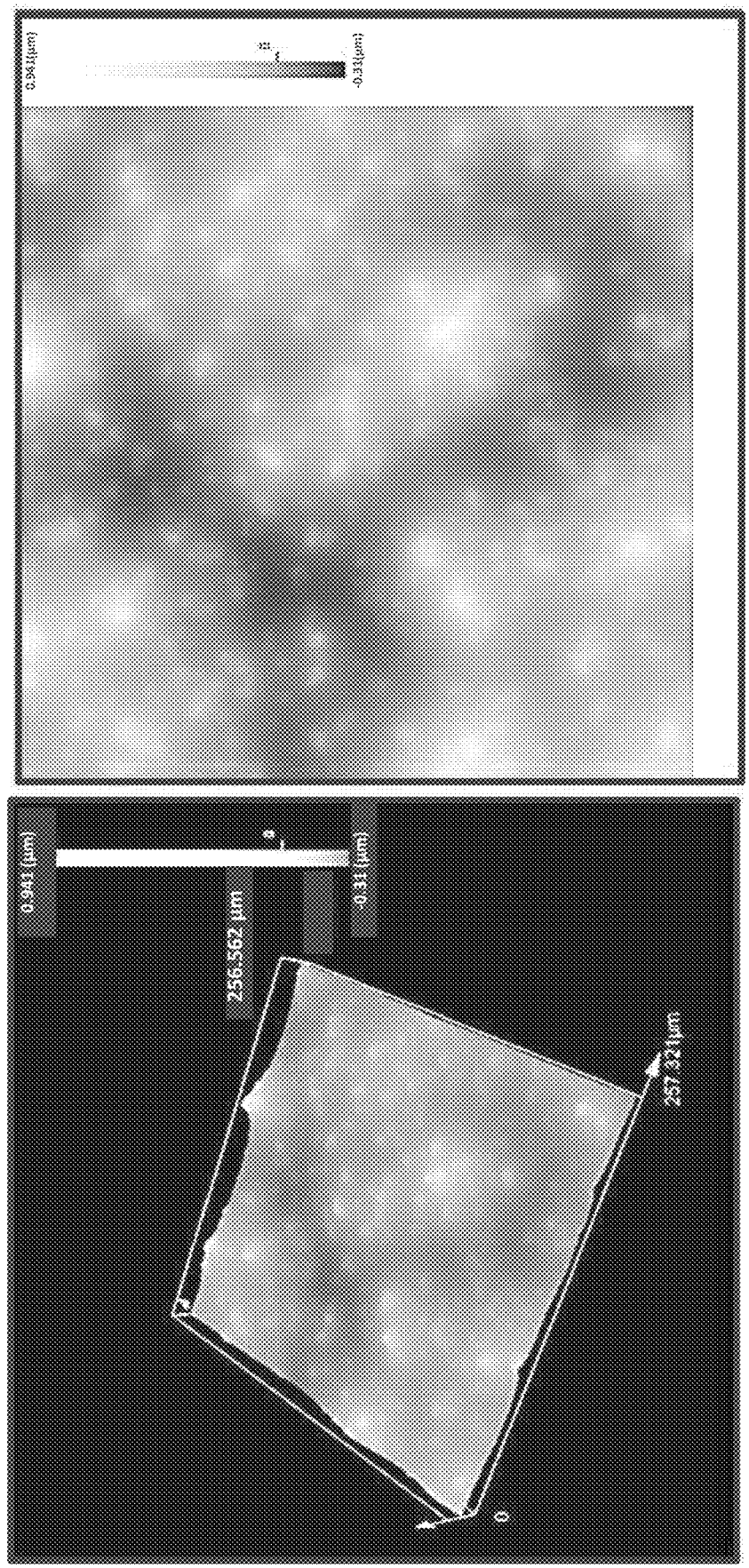
FIG. 4 is the image of the surface roughness analysis of the anti-glare film of Example 1 under an OLYMPUS 3D laser microscope at a magnification of 50.

The obtained anti-glare film was observed under an optical microscope at a magnification of 200 to obtain a light transmission image, as shown in FIG. 1, and was observed under an OLYMPUS 3D laser microscope at a magnification of 50 to obtain a surface roughness analysis image, as shown in FIG. 4.

Example 2: Preparation of Anti-Glare Film

An anti-glare composition was prepared in the same manner as in Example 1, except that the silica nanoparticle dispersion sol with an average primary particle diameter of specific surface area method (BET) of 70 nm to 100 nm (MEK-ST-ZL, solid content 30%, solvent: butanone, available from Nissan Chemical, Japan) was used instead of the silica nanoparticle dispersion sol used in Example 1, and the polyether-modified polydimethylsiloxane (BYK-3455, solid content 10%, solvent: ethyl acetate, available from BYK, Germany) of 7.5 parts by weight was used to replace the addition of the polyether-modified siloxane in Example 1.

The prepared anti-glare composition was coated on a PET substrate with a thickness of 80 μm, and then the coated substrate was dried and was cured by UV lamp with a radiation dose of 80 mJ/cm$^2$ under a nitrogen atmosphere. Thus, an anti-glare film comprising an anti-glare hard coating layer with a thickness of 3.3 μm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Figure 2:
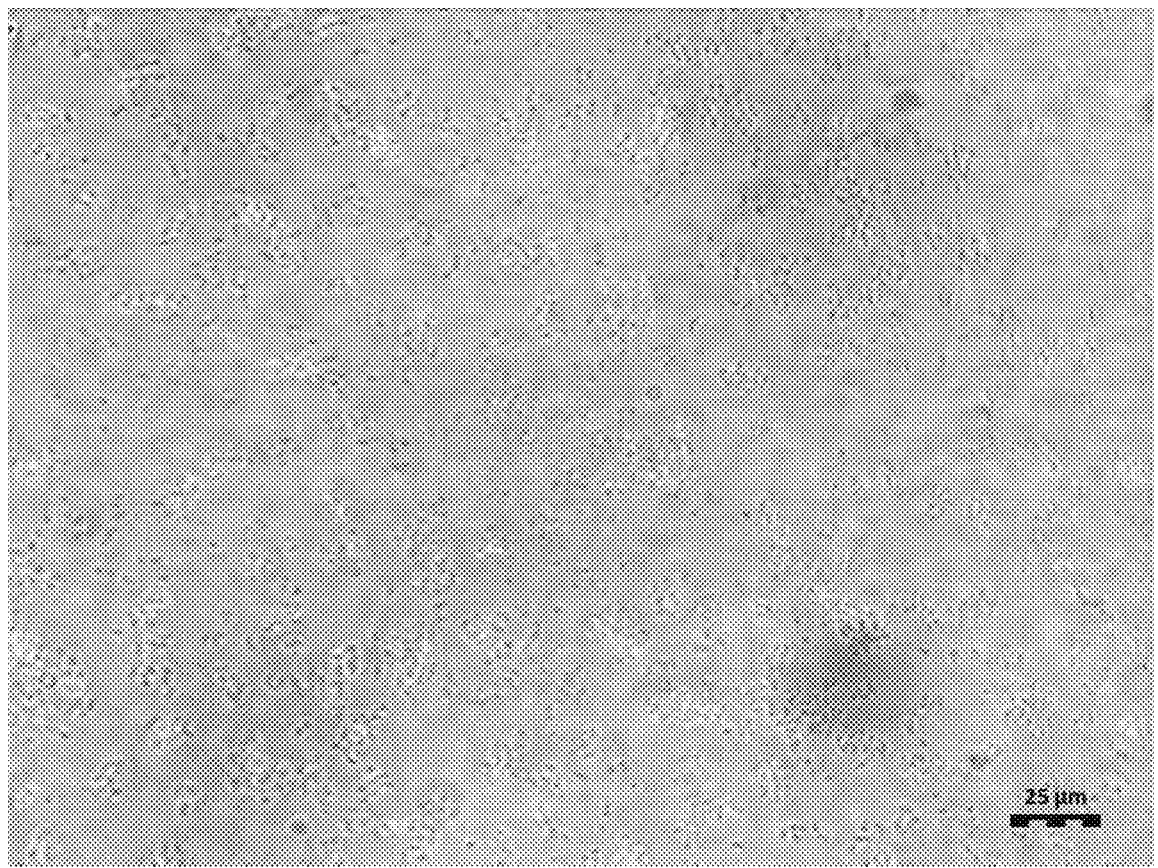
FIG. 2 is the light transmission image of the anti-glare film of Example 2 under an optical microscope at a magnification of 200.
Figure 5:
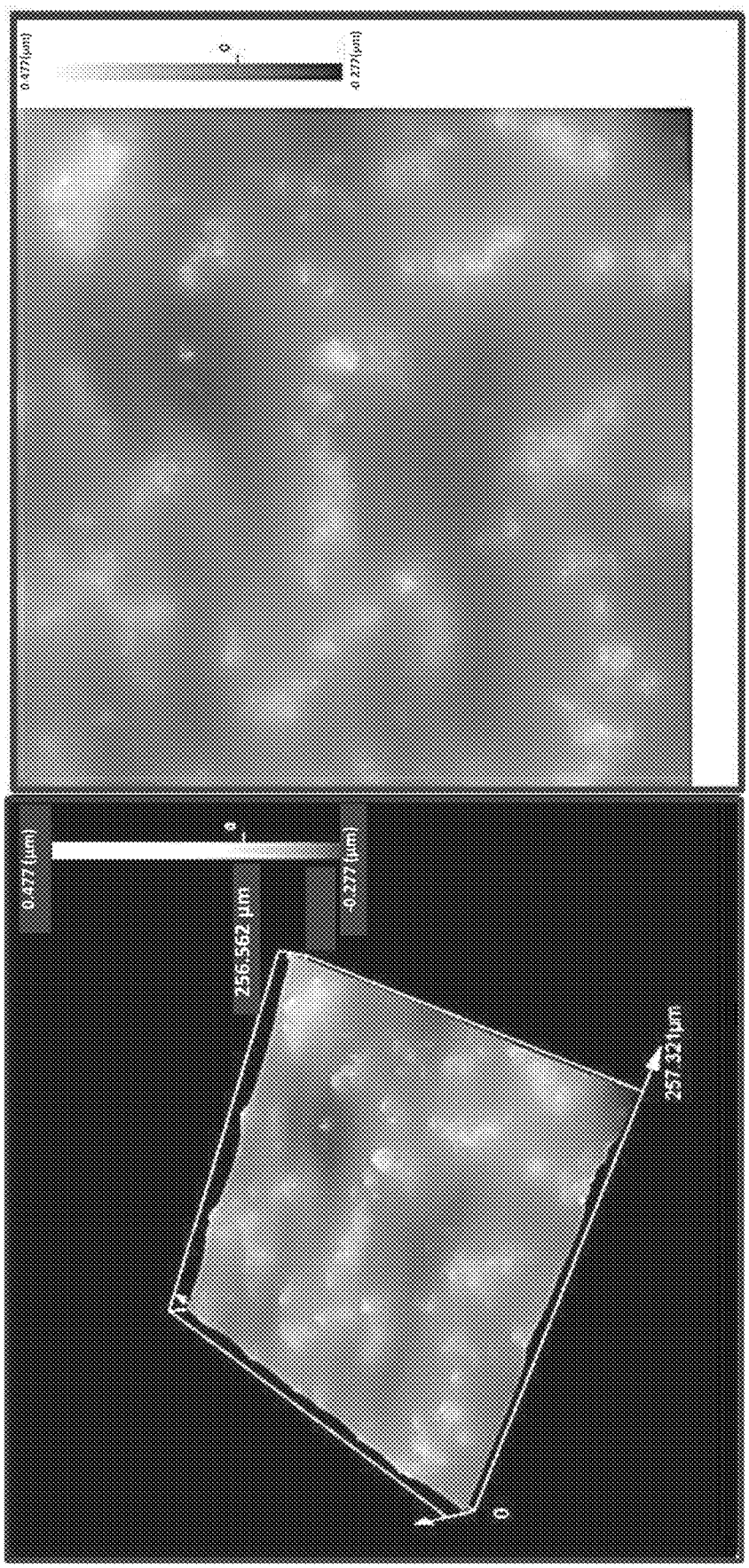
FIG. 5 is the image of the surface roughness analysis of the anti-glare film of Example 2 under an OLYMPUS 3D laser microscope at a magnification of 50.

The obtained anti-glare film was observed under an optical microscope at a magnification of 200 to obtain a light transmission image, as shown in FIG. 2, and was observed under an OLYMPUS 3D laser microscope at a magnification of 50 to obtain a surface roughness analysis image, as shown in FIG. 5.

Example 3: Preparation of Anti-Glare Film

An anti-glare composition was prepared in the same manner as in Example 1, except that the silica nanoparticle dispersion sol with an average primary particle diameter of specific surface area method (BET) of 40 nm to 50 nm (MEK-AC-4130Y, solid content 30%, solvent: butanone, available from Nissan Chemical, Japan) was used instead of the silica nanoparticle dispersion sol used in Example 1, and the polyether-modified siloxane (BYK-349, solid content 10%, solvent: ethyl acetate, available from BYK, Germany) of 7.5 parts by weight was used to replace the addition of the polyether-modified siloxane in Example 1.

The prepared anti-glare composition was coated on a PET substrate with a thickness of 80 μm, and then the coated substrate was dried and was cured by UV lamp with a radiation dose of 80 mJ/cm$^2$ under a nitrogen atmosphere.

Thus, an anti-glare film comprising an anti-glare hard coating layer with a thickness of 3.3 μm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Example 4: Preparation of Anti-Glare Film

An anti-glare composition was prepared in the same manner as in Example 3, except that the polyether-modified polydimethylsiloxane (BYK-3455) of 7.5 parts by weight was used instead of the addition of the polyether-modified siloxane in Example 3.

The prepared anti-glare composition was coated on a PET substrate with a thickness of 80 μm, and then the coated substrate was dried and was cured by UV lamp with a radiation dose of 80 mJ/cm$^2$ under a nitrogen atmosphere. Thus, an anti-glare film comprising an anti-glare hard coating layer with a thickness of 3.4 μm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Example 5: Preparation of Anti-Glare Film

An anti-glare composition was prepared in the same manner as in Example 3, except that 5 parts by weight of the silica nanoparticle dispersion sol with an average primary particle diameter of specific surface area method (BET) of 40 nm to 50 nm (MEK-AC-4130Y) was used instead of the using of the silica nanoparticle dispersion sol in Example 3, and the polyether-modified polydimethylsiloxane (BYK-3455) of 7.5 parts by weight was used to replace the addition of the polyether-modified siloxane in Example 3.

The prepared anti-glare composition was coated on a PET substrate with a thickness of 80 μm, and then the coated substrate was dried and was cured by UV lamp with a radiation dose of 80 mJ/cm$^2$ under a nitrogen atmosphere. Thus, an anti-glare film comprising an anti-glare hard coating layer with a thickness of 3.6 μm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Example 6: Preparation of Anti-Glare Film

An anti-glare composition was prepared in the same manner as in Example 5, except that the amount of silica nanoparticle dispersion sol was 20 parts by weight.

The prepared anti-glare composition was coated on a PET substrate with a thickness of 80 μm, and then the coated substrate was dried and was cured by UV lamp with a radiation dose of 80 mJ/cm$^2$ under a nitrogen atmosphere. Thus, an anti-glare film comprising an anti-glare hard coating layer with a thickness of 3.4 μm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Example 7: Preparation of Anti-Glare Film

An anti-glare composition was prepared in the same manner as in Example 6, except that the amount of the polyether-modified polydimethylsiloxane (BYK-3455) was 1.5 parts by weight.

The prepared anti-glare composition was coated on a PET substrate with a thickness of 80 μm, and then the coated substrate was dried and was cured by UV lamp with a radiation dose of 80 mJ/cm$^2$ under a nitrogen atmosphere. Thus, an anti-glare film comprising an anti-glare hard coating layer with a thickness of 3.6 μm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Example 8: Preparation of Anti-Glare Film

An anti-glare composition was prepared in the same manner as in Example 5, except that 40 parts by weight of the silica nanoparticle dispersion sol with an average primary particle diameter of specific surface area method (BET) of 40 nm to 50 nm (MEK-AC-4130Y) was used instead of the using of the silica nanoparticle dispersion sol in Example 5, and the polyether-modified polydimethylsiloxane (BYK-3455) of 3 parts by weight was used to replace the addition of the polyether-modified siloxane in Example 5.

The prepared anti-glare composition was coated on a PET substrate with a thickness of 80 μm, and then the coated substrate was dried and was cured by UV lamp with a radiation dose of 80 mJ/cm$^2$ under a nitrogen atmosphere. Thus, an anti-glare film comprising an anti-glare hard coating layer with a thickness of 3.6 μm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Figure 3:
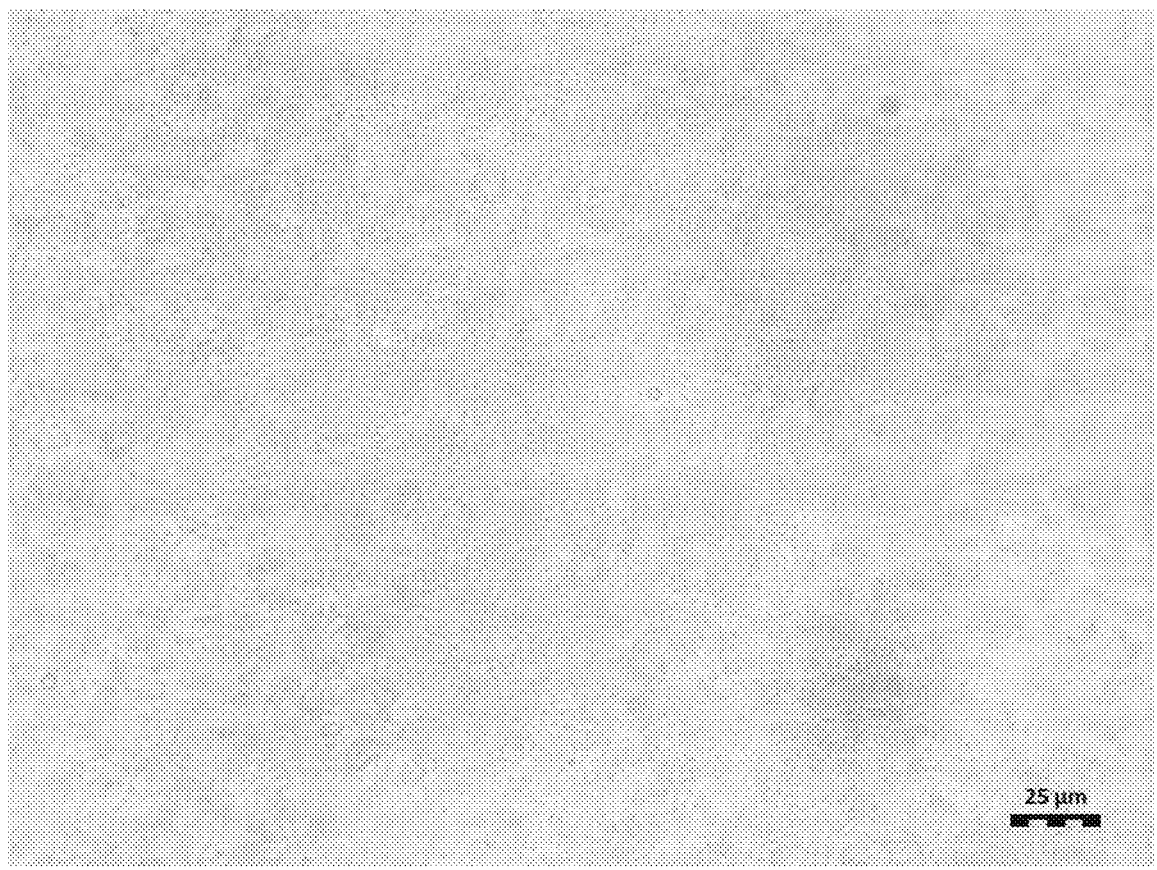
FIG. 3 is the light transmission image of the anti-glare film of Example 8 under an optical microscope at a magnification of 200.
Figure 6:
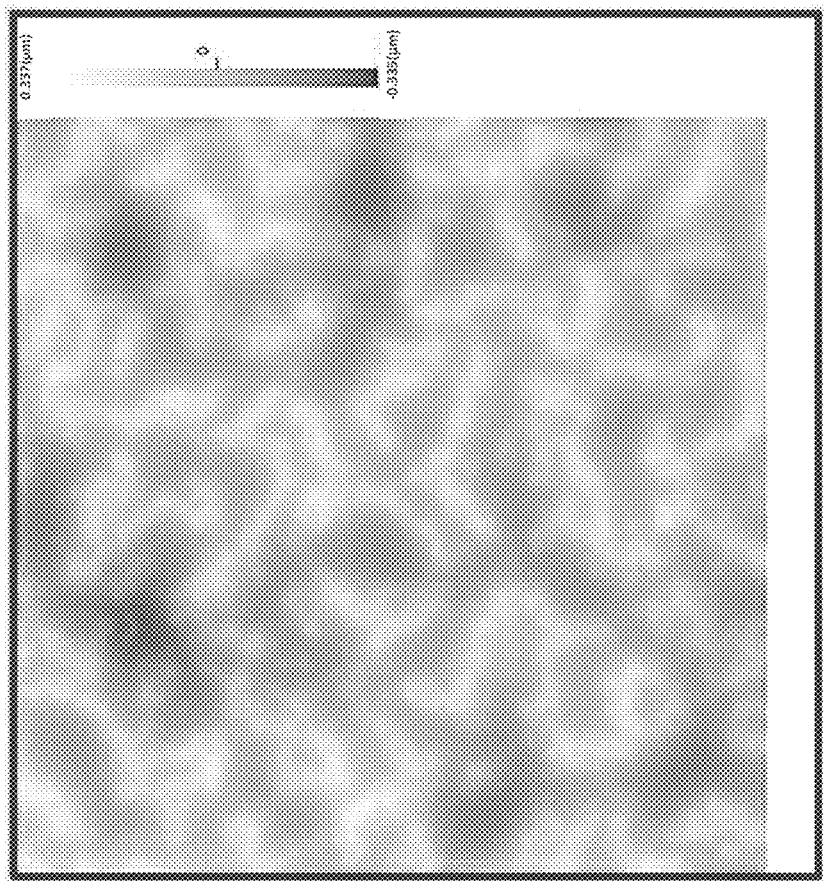
FIG. 6 is the image of the surface roughness analysis of the anti-glare film of Example 8 under an OLYMPUS 3D laser microscope at a magnification of 50.
Figure 6:
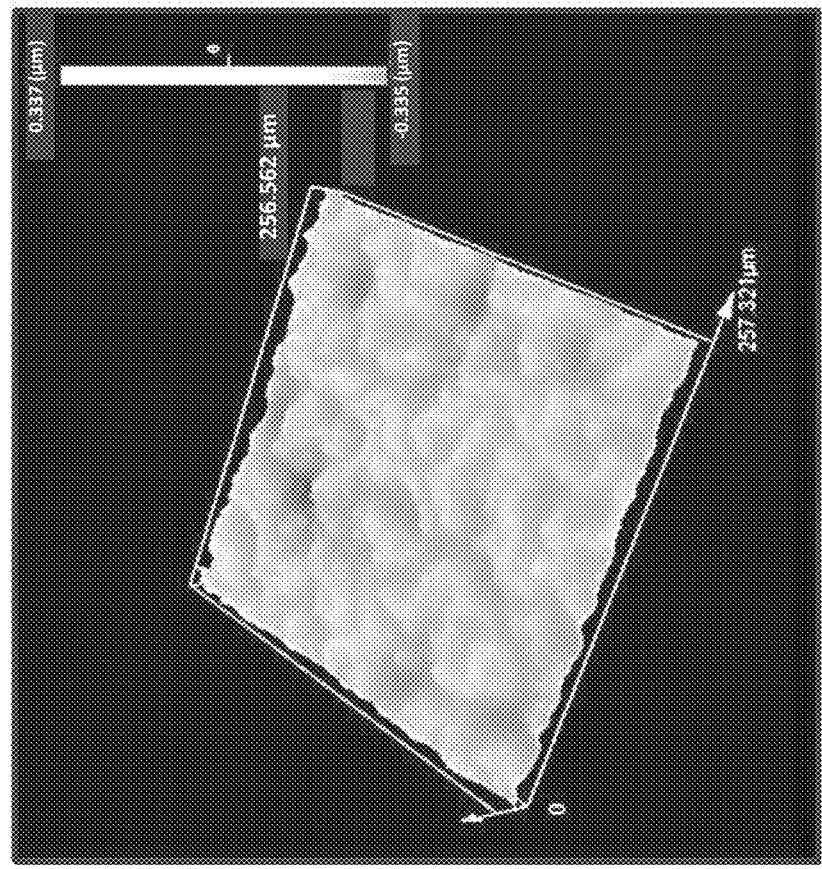

The obtained anti-glare film was observed under an optical microscope at a magnification of 200 to obtain a light transmission image, as shown in FIG. 3, and was observed under an OLYMPUS 3D laser microscope at a magnification of 50 to obtain a surface roughness analysis image, as shown in FIG. 6.

Example 9: Preparation of Anti-Glare Film

An anti-glare composition was prepared in the same manner as in Example 3, except that the polyether-modified polydimethylsiloxane (BYK-3455) of 15 parts by weight was used to replace the addition of the polyether-modified siloxane in Example 3.

The prepared anti-glare composition was coated on a PET substrate with a thickness of 80 µm, and then the coated substrate was dried and was cured by UV lamp with a radiation dose of 80 mJ/cm² under a nitrogen atmosphere. Thus, an anti-glare film comprising an anti-glare hard coating layer with a thickness of 3.4 µm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Example 10: Preparation of Anti-Glare Film

An anti-glare composition was prepared in the same manner as in Example 9, except that the amount of the polyether-modified polydimethylsiloxane (BYK-3455) was 45 parts by weight.

The prepared anti-glare composition was coated on a PET substrate with a thickness of 80 µm, and then the coated substrate was dried and was cured by UV lamp with a radiation dose of 80 mJ/cm² under a nitrogen atmosphere. Thus, an anti-glare film comprising an anti-glare hard coating layer with a thickness of 3.4 µm formed on the PET substrate was obtained.

The properties of the obtained anti-glare film were determined in accordance with the measurement described hereinafter. The test results of light transmittance, haze, gloss and clarity were shown in Table 1, and the test results of average secondary particle size of silica nanoparticles and average area of aggregated silica micro-floccules, surface roughness and anti-glare evaluation were shown in Table 2.

Optical Measurement

The anti-glare films obtained from the Examples were measured according to the following method.

Light transmittance measurement: The light transmittance was measured according to the test method of JIS K7361 by NDH-2000 Haze Meter (manufactured by Nippon Denshoku Industries, Japan).

Haze measurement: The haze was measured according to the test method of JIS K7136 by NDH-2000 Haze Meter.

Gloss measurement: The gloss of the anti-glare films were obtained by adhering the anti-glare films to a black acrylic plate and measuring the gloss thereof according to the test method of JIS Z8741 by BYK Micro-Gloss gloss meter at viewing angles of 20, 60 and 85 degrees.

Clarity measurement: The anti-glare film was cut into a sample of 5×8 cm², and the sample was measured according to the test method of JIS K7374 by SUGA ICM-IT image clarity meter, and the sum of the measured values at slits of 0.125 mm, 0.25 mm, 0.50 mm, 1.00 mm and 2.00 mm was the clarity.

Optical Properties Measurement

Average secondary particle size of silica nanoparticles and average area of aggregated silica micro-floccules measurement: The anti-glare film was cut into a sample of an appropriate size, and the sample was put under a Mitutoyo SV-320 high-magnification optical microscope and photographed a light transmission image at an eyepiece magnification of 10 and an objective lens magnification of 20 by the CCD camera. The average secondary particle size of silica nanoparticles and average area of aggregated silica micro-floccules could be calculated based on the light transmission image by the image measurement software.

Surface roughness measurement: The anti-glare film was adhered to a black acrylic plate with transparent optical adhesive, forming a sample, and the sample was photographed four 3D surface roughness images with an area of 256×256 µm² by OLYMPUS LEXT OLS5000-SAF 3D laser conjugate focus microscope. Based on the 3D surface roughness images, the arithmetic mean height of surface roughness (Sa) and the maximum height of surface roughness (Sz) of the anti-glare film could be calculated according to the description of surface roughness of ISO 25178, and the average roughness of centerline (Ra), the height of total roughness (Ry), the average peak spacing of total roughness (RSm) and the slope of root mean square of total roughness (Rdq) of the anti-glare film could be calculated according to the description of line roughness of ISO 4287.

Anti-glare evaluation: The anti-glare films were adhered to a black acrylic plate, and the surfaces of the prepared samples were illuminated by 2 fluorescent tubes to check the status of reflected by observation. The evaluation criteria were as below.

Lv.1: Two separate fluorescent tubes could be seen clearly and the straight outlines of tubes was distinguished obviously;

Lv.2: Two separate fluorescent tubes could be seen clearly, but the outlines of tubes were slightly fuzzy;

Lv.3: Two separate fluorescent tubes could be seen, and although the outlines of tubes were slightly fuzzy but the shapes of tubes could be distinguished;

Lv.4: It could be seen that there are 2 fluorescent tubes, but the shapes of tubes could not be distinguished;

Lv.5: It could not be seen that there are 2 fluorescent tubes and the shapes of tubes could not be distinguished.

The optical test results of the anti-glare films obtained from Examples 1 to 10 are shown in Table 1.

TABLE 1

The optical test results of the anti-glare films obtained from Examples 1 to 10

| Example | Haze (%) | Light transmittance (%) | Gloss 20° | Gloss 60° | Gloss 85° | Clarity |
|---|---|---|---|---|---|---|
| Example 1 | 1.4 | 91.8 | 50.9 | 81.4 | 90.7 | 248.8 |
| Example 2 | 1.2 | 91.9 | 65.7 | 85.7 | 92.9 | 381.7 |
| Example 3 | 1.0 | 91.8 | 69.8 | 89.4 | 93.9 | 357.2 |
| Example 4 | 1.1 | 91.8 | 71.1 | 89.7 | 94.1 | 389.0 |
| Example 5 | 0.8 | 92.0 | 80.1 | 91.7 | 95.0 | 421.6 |
| Example 6 | 1.5 | 91.7 | 39.0 | 80.2 | 92.0 | 310.7 |
| Example 7 | 1.1 | 92.1 | 66.2 | 88.6 | 94.9 | 438.4 |
| Example 8 | 1.1 | 91.9 | 35.7 | 79.1 | 93.2 | 448.2 |
| Example 9 | 0.9 | 91.9 | 67.7 | 89.2 | 94.4 | 397.3 |
| Example 10 | 1.0 | 92.0 | 73.3 | 90.1 | 94.9 | 408.0 |

The test results of average secondary particle size of silica nanoparticles and average area of aggregated silica micro-floccules, surface roughness and anti-glare evaluation of the anti-glare films obtained from Examples 1 to 10 are shown in Table 2.

TABLE 2

The test results of optical properties of the anti-glare films obtained from Examples 1 to 10

| Example | Anti-glare evaluation | Average secondary particle size of silica nanoparticles (nm) | Average area of aggregated silica micro-floccules (μm²) | Surface roughness Arithmetic mean height of surface roughness Sa[μm] | Surface roughness Maximum height of surface roughness Sz[μm] | Average roughness of centerline Ra[μm] | Height of total roughness Ry[μm] | Line roughness Average peak spacing of total roughness RSm[μm] | Line roughness Slope of root mean square of total roughness Rdq[°] |
|---|---|---|---|---|---|---|---|---|---|
| Example 1 | Lv.3 | 2227 | 354 | 0.116 | 1.055 | 0.096 | 0.518 | 99.522 | 2.188 |
| Example 2 | Lv.3 | 2706 | 560 | 0.073 | 0.658 | 0.056 | 0.320 | 107.174 | 1.225 |
| Example 3 | Lv.3 | 2438 | 424 | 0.102 | 0.821 | 0.068 | 0.384 | 88.286 | 1.506 |
| Example 4 | Lv.3 | 2640 | 616 | 0.087 | 0.640 | 0.066 | 0.344 | 111.591 | 1.153 |
| Example 5 | Lv.2 | 2585 | 399 | 0.039 | 0.406 | 0.026 | 0.148 | 62.997 | 0.686 |
| Example 6 | Lv.3 | 2442 | 958 | 0.097 | 0.685 | 0.088 | 0.446 | 69.199 | 1.791 |
| Example 7 | Lv.2 | 2141 | Co-continuous network aggregation | 0.056 | 0.441 | 0.055 | 0.290 | 52.110 | 1.205 |
| Example 8 | Lv.2 | 1540 | Co-continuous network aggregation | 0.083 | 0.604 | 0.074 | 0.391 | 40.213 | 1.699 |
| Example 9 | Lv.2 | 2436 | 760 | 0.069 | 0.576 | 0.062 | 0.324 | 93.282 | 1.192 |
| Example 10 | Lv.2 | 3019 | 715 | 0.063 | 0.579 | 0.054 | 0.281 | 86.135 | 1.195 |

In the present anti-glare films of Examples 1 to 10, the micro-floccules of flocculatedsilica nanoparticles are formed via the interaction between the silica nanoparticles and the polyether-modified siloxane compound, and the forming of the floccules with an average secondary particle size of between 1,500 nm and 3,100 nm and with an average aggregation area of between 354 μm² and 958 μm² or the co-continuous network structure, can provide the anti-glare film good anti-glare properties and a haze of less than 5%. At the same time, the present anti-glare films of Examples 1 to 10 have fine surfaces, the arithmetic mean height of surface roughness (Sa) of the anti-glare film is ranging between 0.039 μm and 0.116 μm, the maximum height of surface roughness (Sz) thereof is ranging between 0.406 μm and 1.055 μm, the average roughness of centerline (Ra) thereof is ranging between 0.026 μm and 0.096 μm, the height of total roughness (Ry) thereof is ranging between 0.148 μm and 0.518 μm, the average peak spacing of total roughness (RSm) thereof is ranging between 40.213 μm and 111.591 μm and the slope of root mean square of total roughness (Rdq) thereof is ranging between 0.686 and 2.188. The present anti-glare films of Examples 1 to 10 show excellent anti-glare properties and satisfactory surface fineness.

Example 11: Preparation of Anti-Glare Film

An anti-glare composition was prepared in the same manner as in Example 4. Except for 10 parts by weight of silica nanoparticle dispersion sol (MEK-AC-4130Y) were added in the anti-glare composition, 10 parts by weight of polymethyl methacrylate particles of an average particle size of 2 μm and a refractivity of 1.49 (SSX-102, available from Sekisui Plastics Co., LTD., Japan) were also added.

The prepared anti-glare composition was coated on a PET substrate with a thickness of 80 μm, and then the coated substrate was dried and was cured by UV lamp with a radiation dose of 80 mJ/cm² under a nitrogen atmosphere. Thus, an anti-glare film comprising an anti-glare hard coating layer with a thickness of 3.7 μm formed on the PET substrate was obtained.

The properties of the obtained anti-glare film were determined in accordance with the measurement described hereinafter. The test results of light transmittance, haze, gloss and clarity were shown in Table 3, and the test results of average secondary particle size of silica nanoparticles and average area of aggregated silica micro-floccules, surface roughness and anti-glare evaluation were shown in Table 4.

Example 12: Preparation of Anti-Glare Film

An anti-glare composition was prepared in the same manner as in Example 4. Except for 10 parts by weight of silica nanoparticle dispersion sol (MEK-AC-4130Y) were added in the anti-glare composition, 10 parts by weight of polystyrene particles of an average particle size of 2 μm and a refractivity of 1.59 (SSX-302ABE, available from Sekisui Plastics Co., LTD., Japan) were also added.

The prepared anti-glare composition was coated on a PET substrate with a thickness of 80 μm, and then the coated substrate was dried and was cured by UV lamp with a radiation dose of 80 mJ/cm² under a nitrogen atmosphere. Thus, an anti-glare film comprising an anti-glare hard coating layer with a thickness of 3.7 μm formed on the PET substrate was obtained.

The properties of the obtained anti-glare film were determined in accordance with the measurement described hereinafter. The test results of light transmittance, haze, gloss and clarity were shown in Table 3, and the test results of average secondary particle size of silica nanoparticles and average area of aggregated silica micro-floccules, surface roughness and anti-glare evaluation were shown in Table 4.

Example 11 and 12 illustrate that the organic particles can be further added in the present anti-glare to adjust the haze. The organic particles with different refractivity were added in the anti-glare films of Examples 11 and 12 and the haze of the anti-glare film varies with the selection of organic particles, and the anti-glare films comprising the organic particles still maintain satisfactory gloss and clarity, as shown in Table 3.

TABLE 3

The optical test results of the anti-glare films obtained from Examples 11 and 12

| Example | Haze (%) | Light transmittance (%) | Gloss 20° | Gloss 60° | Gloss 85° | Clarity |
|---|---|---|---|---|---|---|
| Example 11 | 3.5 | 92.1 | 49.0 | 79.7 | 93.6 | 424.7 |
| Example 12 | 10.1 | 91.9 | 55.5 | 82.7 | 93.7 | 380.1 |

Moreover, the average secondary particle size of the silica nanoparticles in the anti-glare film of Example 11 and 12 respectively are 2387 nm and 2657 nm. Although the organic particles are added to the anti-glare layer to adjust the haze, the anti-glare films can provide satisfactory anti-glare properties and fine surfaces, as shown in Table 4.

TABLE 4

The test results of optical properties of the anti-glare films obtained from Examples 11 and 12

| Example | Anti-glare evaluation | Average secondary particle size of silica nanoparticles (nm) | Average area of aggregated silica micro-floccules (μm²) | Surface roughness Arithmetic mean height of surface roughness Sa[μm] | Surface roughness Maximum height of surface roughness Sz[μm] | Average roughness of centerline Ra[μm] | Line roughness Height of total roughness Ry[μm] | Line roughness Average peak spacing of total roughness RSm[μm] | Line roughness Slope of root mean square of total roughness Rdq[°] |
|---|---|---|---|---|---|---|---|---|---|
| Example 11 | Lv.3 | 2387 | 554 | 0.124 | 1.048 | 0.111 | 0.584 | 72.556 | 2.270 |
| Example 12 | Lv.3 | 2657 | 630 | 0.120 | 0.963 | 0.107 | 0.529 | 90.113 | 2.143 |

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. An anti-glare film, comprising:
a transparent substrate; and
an anti-glare layer, wherein the anti-glare layer comprises an acrylic binder resin, a polyether-modified siloxane and a plurality of silica nanoparticles;
wherein the acrylic binder resin comprises a initiator, and a (meth)acrylate composition comprising:
35 to 50 parts by weight of the polyurethane (meth) acrylate oligomer with a functionality of 6 to 15;
12 to 20 parts by weight of the (meth)acrylate monomer with a functionality of 3 to 6; and
1.5 to 12 parts by weight of the (meth)acrylate monomer with a functionality of less than 3;
wherein part of the silica nanoparticles are flocculated into micro-floccules, and each of the micro-floccules has an average secondary particle size ranging between 1,500 nm and 3,100 nm.

2. The anti-glare film as claimed in claim 1, wherein the arithmetic mean height of surface roughness (Sa) of the anti-glare film is ranging between 0.03 μm and 0.18 μm, the maximum height of surface roughness (Sz) thereof is ranging between 0.30 μm and 1.80 μm, the average roughness of centerline (Ra) thereof is ranging between 0.01 μm and 0.16 μm, the height of total roughness (Ry) is ranging between 0.10 μm and 0.90 μm, the average peak spacing of total roughness (RSm) thereof is ranging between 20 μm and 200 μm, and the slope of root mean square of total roughness (Rdq) thereof is ranging between 0.36° and 4.60°.

3. The anti-glare film as claimed in claim 1, wherein the polyether-modified siloxane is represented by the following formula (I):

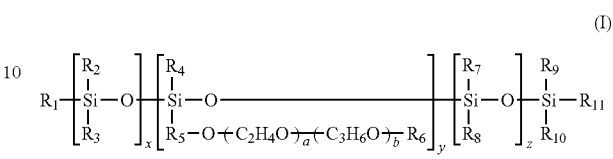

wherein, each of $R_1$ to $R_4$ and $R_6$ to $R_{11}$ is an hydrogen or a $C_1$ to $C_8$ hydrocarbyl-group, $R_5$ is a $C_1$ to $C_{10}$ hydrocarbyl-group, x, y and a is 1 or an integer greater than 1, z and b is 0 or an integer greater than 0, and the average molecular weight of the polyether-modified siloxane measured by matrix-assisted laser desorption ionization-time of flight mass spectrometry (MALDI-TOF MS) is ranging between 200 and 6,000 and the average ethylene oxide (EO) unit thereof is ranging between 1 and 40.

4. The anti-glare film as claimed in claim 3, wherein the average molecular weight of the polyether-modified siloxane measured by matrix-assisted laser desorption ionization-time of flight mass spectrometry (MALDI-TOF MS) is ranging between 200 and 4,500 and the average ethylene oxide (EO) unit thereof is ranging between 1 and 35.

5. The anti-glare film as claimed in claim 1, wherein the amount of the silica nanoparticles is ranging between 0.1 parts and 15 parts by weight per hundred parts by weight of the acrylic binder resin.

6. The anti-glare film as claimed in claim 1, wherein the amount of the polyether-modified siloxane is ranging between 0.01 parts and 8 parts by weight per hundred parts by weight of the acrylic binder resin.

7. The anti-glare film as claimed in claim 1, wherein the weight ratio of the silica nanoparticles to the polyether-modified siloxane is ranging between 0.5 and 100.

8. The anti-glare film as claimed in claim 1, wherein the average primary particle diameter of silica nanoparticles of specific surface area method (BET) is ranging between 10 nm and 160 nm.

9. The anti-glare film as claimed in claim 1, wherein the average primary particle diameter of silica nanoparticles of specific surface area method (BET) is ranging between 20 nm and 100 nm.

10. The anti-glare film as claimed in claim 1, wherein the polyurethane (meth)acrylate oligomer with a functionality of 6 to 15 is an aliphatic polyurethane (meth)acrylate oligomer.

11. The anti-glare film as claimed in claim 1, wherein the (meth)acrylate monomer with a functionality of 3 to 6 is selected from one of the group consisting of pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A) and pentaerythritol tri(meth)acrylate (PET(M)A), or combinations thereof.

12. The anti-glare film as claimed in claim 1, wherein the (meth)acrylate monomer with a functionality of less than 3 is selected from one of the group consisting of 2-ethylhexyl (meth)acrylate (2-EH(M)A), 2-hydroxyethyl (meth)acrylate (2-HE(M)A), 3-hydroxypropyl (meth)acrylate (3-HP(M)A), 4-hydroxybutyl (meth)acrylate (4-HB(M)A), 2-butoxyethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A) and isobornyl (meth)acrylate (IBO(M)A), or combinations thereof.

13. The anti-glare film as claimed in claim 1, wherein the initiator is selected from one of the group consisting of acetophenones-based initiator, diphenylketones-based initiator, propiophenones-based initiator, benzophenones-based initiator, bifunctional α-hydroxyketones-based initiator and acylphosphine oxides-based initiator, or combinations thereof.

14. An anti-glare film, comprising:
a transparent substrate; and
an anti-glare layer, wherein the anti-glare layer comprises an acrylic binder resin, a polyether-modified siloxane, a plurality of silica nanoparticles and a plurality of organic particles;
wherein the acrylic binder resin comprises a initiator, and a (meth)acrylate composition comprising:
35 to 50 parts by weight of the polyurethane (meth)acrylate oligomer with a functionality of 6 to 15;
12 to 20 parts by weight of the (meth)acrylate monomer with a functionality of 3 to 6; and
1.5 to 12 parts by weight of the (meth)acrylate monomer with a functionality of less than 3;
wherein part of the silica nanoparticles are flocculated into micro-floccules, and each of the micro-floccules has an average secondary particle size ranging between 1,500 nm and 3,100 nm.

15. The anti-glare film as claimed in claim 14, wherein the diameter of each of the organic particles is ranging between 0.5 μm and 6 μm.

16. The anti-glare film as claimed in claim 14, wherein the refractivity of each of the organic particles is ranging between 1.4 and 1.6.

17. The anti-glare film as claimed in claim 14, wherein the usage amount of the organic particles is ranging between 0.5 parts and 15 parts by weight per hundred parts by weight of the acrylic binder resin.

18. The anti-glare film as claimed in claim 14, wherein the organic particles is selected from one of the group consisting of polymethyl methacrylate resin particles, polystyrene resin particles, styrene-methyl methacrylate copolymer particles, polyethylene resin particles, epoxy resin particles, polysiloxane resin particles, polyvinylidene fluoride resin particles and polyvinyl fluoride resin particles, or combinations thereof.

19. A polarizer, comprising:
a polarizing element; and
an anti-glare film as claimed in claim 1 formed on a surface of the polarizing element.

20. A polarizer, comprising:
a polarizing element; and
an anti-glare film as claimed in claim 14 formed on a surface of the polarizing element.

* * * * *